United States Patent [19]

Chambers, Jr.

[11] 3,828,281

[45] Aug. 6, 1974

[54] IMPEDANCE SIMULATING CIRCUIT FOR TRANSMISSION LINES

[75] Inventor: Charles W. Chambers, Jr., Amherst, Ohio

[73] Assignee: Lorain Products Corporation, Lorain, Ohio

[22] Filed: Feb. 26, 1973

[21] Appl. No.: 335,488

[52] U.S. Cl. ............... 333/17, 179/170 G, 333/80 R

[51] Int. Cl. ............................................ H03h 11/00

[58] Field of Search ....... 333/17, 17 M, 80 R, 80 T; 323/45; 179/170 G, 170.2, 175.31 E

[56] References Cited

UNITED STATES PATENTS

| | | | |
|---|---|---|---|
| 3,413,576 | 11/1968 | Sheahan | 333/80 R |
| 3,600,668 | 8/1971 | Goldberg | 323/45 X |
| 3,643,163 | 2/1972 | Bruck | 333/17 UX |

*Primary Examiner*—Paul L. Gensler
*Attorney, Agent, or Firm*—Edward C. Jason

[57] ABSTRACT

A circuit for simulating the presence of positive or negative impedances in shunt or in series with a transmission line. A voltage generating circuit generates an impedance simulating voltage and introduces that voltage in series with the transmission line. A current generating circuit generates an impedance simulating current and introduces that current in shunt with the transmission line. Current feedback circuitry controls the voltage generating circuitry in accordance with the amplitude of the signal current in the transmission line to simulate either a positive or negative series impedance. Voltage feedback circuitry controls the current generating circuitry in accordance with the signal voltage across the transmission line to simulate either a positive or negative shunt impedance. Circuitry is also provided to afford these simulated impedances in the presence of echo suppressing and impedance matching characteristics.

15 Claims, 9 Drawing Figures

PATENTED AUG 6 1974

3,828,281

PATENTED AUG 6 1974 3,828,281

SHEET 2 OF 3

IMPEDANCE SIMULATING CIRCUIT FOR TRANSMISSION LINES

BACKGROUND OF THE INVENTION

The present invention relates to circuitry for simulating the presence of positive or negative impedances and is directed more particularly to circuitry for controllably introducing simulated positive or negative impedances in series or in shunt with two-wire transmission lines such as, for example, telephone lines.

In affording satisfactory transmission characteristics to signal transmission through two-wire transmission lines, it is often necessary to introduce various types of impedances either in series with the line, in shunt with the line or both in series and in shunt with the line. In loading a cable, for example, loading coils having predetermined inductances and resistances are connected in series with the transmission line at locations periodically spaced along its length. Another example is the utilization of line-build-out networks for introducing series and shunt impedances into the transmission line for the purpose of building out its impedance to a standardized value. Still another example is the utilization of attenuator pads, comprising sets of series and shunt connected resistances, for introducing necessary signal losses.

The series and shunt impedance which are introduced into a transmission line may also consist of negative impedances, that is, impedances which utilize external power to, in effect, cancel a portion of the positive series or shunt impedance of the transmission line. Repeater circuits, for example, often consist of series and shunt connected networks having negative impedance characteristics, these characteristics being provided for the purpose of increasing the amplitude of signal transmission as an attenuator pad reduces the amplitude of signal transmission. Often negative impedance repeaters are used in conjunction with positive series and shunt impedances such as line-build-out networks. In such usage, the repeater provides the desired increase in the amplitude of signal transmission and one or more line-build-out networks provide the series and shunt connected impedances necessary to match the repeater to the line.

Another example of the utilization of series and shunt impedances in transmission lines is a circuit which produces a loss in one direction of transmission and no loss in the opposite direction of transmission, for example, an echo suppressor. In such circuits, impedance networks such as attenuator pads may be utilized to produce loss in one direction and may be rendered ineffective to produce attenuation in the opposite directions. One circuit environment where such circuits are useful is in a hybrid amplifier, that is, an amplifier wherein paired amplifiers are utilized to amplify signals in respective directions in respective unidirectional transmission lines. In such systems, echo suppressors are often utilized to prevent the amplifier which amplifies transmission in one conductor pair from feeding the amplifier which amplifies transmission in the associated conductor pair and thereby causing oscillation.

Prior to the present invention, impedance insertion networks such as line-build-out networks, loading coils, pads, repeaters and echo suppressors comprised fundamentally different kinds of circuits each of which was subject to a variety of problems in construction, adjustment or usage. Line-build-out networks, loading coils and attenuator pads, for example, are either difficult to adjust or balance or are not adjustable. Repeaters, on the other hand, are adjustable but require one or more line-build-out networks which are difficult to adjust and balance. Furthermore, echo suppressors are generally complex and also exhibit adjustment and balancing difficulties.

In accordance with the present invention, there is provided impedance simulating circuitry whereby either positive or negative impedances may be introduced either in series or in shunt with a transmission line and controlled in accordance with the function which such impedances are to perform to provide line-build-out characteristics, loading characteristics, attenuation characteristics, repeater characteristics or echo suppressor characteristics. In addition, the circuit of the invention is adapted to afford such characteristics in the presence of simplicity of construction, adjustment and line balancing.

SUMMARY OF THE INVENTION

It is an object of the invention to provide an improved apparatus for simulating the presence of positive or negative impedances in series or in shunt with a transmission line.

Another object of the invention is to provide an apparatus which is adapted to simulate positive or negative resistance, positive or negative inductance, positive or negative capacitance or a combination thereof.

Yet another object of the invention is to provide an impedance simulating apparatus wherein the series and shunt impedances may be switched into or out of association with the transmission line, under the control of electronic switching means.

Still another object of the invention is to provide an impedance simulating apparatus of the above character which remains balanced during changes in the impedances thereof.

It is another object of the invention to provide an impedance simulating apparatus which includes circuitry whereby gain or signal amplification may be provided.

It is yet another object of the invention to provide an impedance simulating apparatus which includes circuitry whereby impedance matching may be afforded in the presence of a negative resistance characteristic.

Another object of the invention is to provide an impedance simulating apparatus including circuitry for introducing an impedance simulating voltage in series with the transmission line and varying that voltage in accordance with a current feedback signal that is proportional to the signal current through the transmission line, and including circuitry for introducing an impedance simulating current in shunt with the transmission line and varying that current in accordance with a voltage feedback signal that is proportional to the signal voltage across the transmission line.

DESCRIPTION OF THE INVENTION

Figures 1, 1A, 1B, 1C, 1D, 1E, 1F:
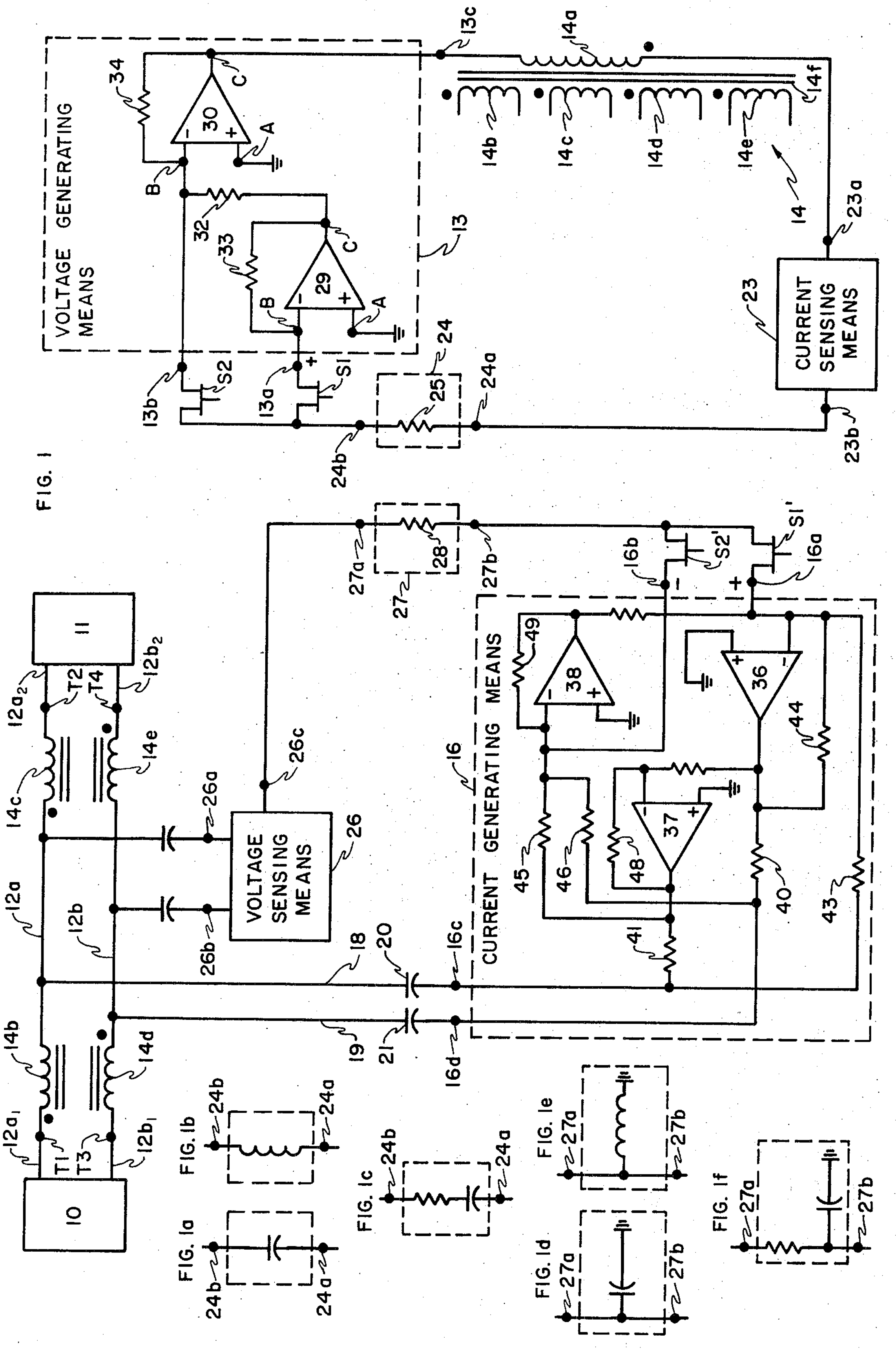
FIG. 1 is a schematic diagram of one exemplary embodiment of the circuit of the invention.
FIGS. 1*a*, 1*b*, 1*c*, 1*d*, 1*e* and 1*f* are fragmentary schematic diagrams showing exemplary modifications to the circuit of FIG. 1.

Referring to FIG. 1, there is shown transmitting-receiving station 10 for transmitting signals to and receiving signals from a transmitting-receiving station 11 through the conductors 12$a_1$–12$a_2$ and 12$b_1$–12$b_2$ of a two-wire transmission line. Stations 10 and 11 may, for example, comprise telephone sets which are connected through the conductors of a two-wire telephone line.

To the end that there may be introduced in series with the transmission line an impedance simulating voltage, that is, a voltage which affects transmission through the transmission line in the same manner as a series connected impedance, there is provided voltage generating means 13 having input terminals 13*a* and 13*b* and an output terminal 13*c*. The impedance simulating voltage generated by generator 13 appears at output 13*c* thereof and is applied in series with line conductors 12*a*and 12*b* through voltage output coupling or connecting means which here takes the form of transformer 14 having a primary winding 14*a* and secondary windings 14*b*, 14*c*, 14*d* and 14*e* which may be located on a common core 14*f*. In the present embodiment, it is contemplated that secondary windings 14*b*, 14*c*, 14*d* and 14*e* have substantially equal numbers of turns. This equality of turns assures that the desired impedance simulating voltage is introduced into the transmission line, between the terminal pairs $T_1$–$T_2$ and $T_3$ –$T_4$ of the circuit of the invention, in four substantially equal parts and thereby assures the maintenance of line balance before, during and after changes in the amplitude of the impedance simulating voltage.

To the end that there may be introduced in shunt with the transmission line an impedance simulating current, that is, a current which affects transmission through the transmission line in the same manner as a shunt connected impedance, there is provided current generating means 16 having input terminals 16*a* and 16*b* and output terminals 16*c* and 16*d*. The impedance simulating current generated by generator 16 appears at outputs 16*c* and 16*d* thereof and is applied in shunt with line conductors 12*a* and 12*b* through current output coupling means which here takes the form of conductors 18 and 19 and capacitors 20 and 21. In the present embodiment, it is contemplated that the impedance simulating currents in conductors 18 and 19 be substantially equal in magnitude but opposite in sign. This condition assures that substantially equal but opposite impedance simulating currents are introduced into conductor pairs 12$a_1$–12$a_2$ and 12$b_1$–12$b_2$ and thereby assures the maintenance of line balance before, during and after changes in the amplitude of the impedance simulating current.

In order that the voltages on transformer windings 14*b*, 14*c*, 14*d* and 14*e* may each have magnitudes which vary with line current in the same manner as the voltages across physical impedances such as resistances connected in series between circuit terminal pairs $T_1$–$T_2$ and $T_3$–$T_4$, there is provided current sensing means 23 having an input 23*a* and an output 23*b* and current feedback means 24 having an input 24*a* and an output 24*b*. As will be explained more fully presently, current sensing means 23 serves to energize one of the inputs of voltage generator 13 with an input signal that is proportional to the signal current through the transmission line. This assures that the magnitudes of the impedance simulating voltages may vary with variations in the magnitude of signal current flow and thereby simulate the presence of an actual impedance. Current feedback means 24, inturn, serves to determine the magnitude and character of the simulated series impedance. If, for example, feedback network 24 includes a resistor 25, the simulated series impedances will be resistive. In particular, if the resistance at 25 is relatively large, the simulated series resistance will be relatively small. Similar relationships govern the simulation of reactive impedances as will be seen presently.

Similarly, to the end that the magnitude of the impedance simulating current established by generator 16 may vary with the magnitude of the voltage across the line in the same manner as the currents flowing through actual impedances connected between conductors 12*a* and 12*b*, there is provided voltage sensing means 26 having inputs 26*a* and 26*b* and an output 26*c* and voltage feedback means 27 having an input 27*a* and an output 27*b*. As will be explained more fully presently, voltage sensing means 26 serves to energize one of the inputs of current generator 16 with an input signal that is substantially proportional to the voltage across the transmission line. This assures that the magnitudes of the impedance simulating currents vary with variations in the magnitude of the signal voltage across the transmission line and thereby simulate the presence of actual impedances between conductors 12*a* and 12*b*. Feedback means 27, in turn, serves to determine the magnitude and character of the simulated shunt impedance. If, for example, feedback network 27 includes a resistor 28, the simulated shunt impedance will be resistive. In particular, if the resistance at 28 is relatively small, the resistance of the simulated resistor between conductors 12*a* and 12*b* will be relatively small and if the resistance at 28 is relatively large, a relatively large simulated resistor will appear between those conductors.

In view of the foregoing, it will be seen that both the series and shunt impedance simulating circuits comprise circuits wherein a first electrical quantity such as voltage or current is generated, in accordance with a second electrical quantity such as line current or line voltage, respectively, and introduced into the transmission line to affect signal transmission in the manner of actual positive or negative impedances. In both instances the magnitude and character of the simulated impedance is determined by the magnitude and character of the impedance of the associated feedback network. Thus, the series and shunt impedance simulating networks are structurally and conceptually similar and differ only in their adaptation for performing different impedance simulating purposes.

When voltage generator 13 and current generator 16 operate simultaneously, transmission through the transmission line is affected as if four substantially equal, actual impedances were connected in the place of windings 14*b*, 14*c*, 14*d* and 14*e* and as if an actual impedance were connected between conductors 12*a* and 12*b*. If the latter simulated impedances are chosen to be resistive, the resulting simulated resistor configuration will be the same as the resistor configuration used in attenuator pads which are realized by actual resistances. Accordingly, the circuit of FIG. 1 can, by selecting suitable feedback resistors 25 and 28, be utilized to modify the transmission characteristics of a transmission line in the same manner as an actual attenuator pad.

One important advantage of utilizing simulated as opposed to actual resistors, is that the utilization of a-c coupling devices as, for example, transformer 14 and capacitors 20 and 21 at the outputs of the voltage and current generators, allows the circuit of FIG. 1 to affect only the a-c or signal component of the transmission through the transmission line and to leave unaffected transmission through the transmission line and to leave unaffected the d-c component thereof. This is advantageous because it allows the a-c or voice component of the signal to be attenuated without increasing the series d-c resistance of the line or decreasing the shunt d-c resistance of the line. Thus, the desired transmission characteristic modifying affect can be produced at signal frequencies while preserving the desired high d-c leakage resistance and low d-c series resistance of the transmission line.

In the event that it is desirable for the simulated series impedances introduced by generator 13 to comprise inductances, such inductances may be afforded by connecting a capacitor rather than a resistor between feedback network input 24*a* and feedback network output 24*b*, as shown in FIG. 1*a*. Similarly, if it is desirable to introduce simulated capacitors in series with the transmission line, such capacitors may be afforded by connecting an inductor between feedback network input 24*a* and feedback network output 24*b*, as shown in FIG. 1*b*. Furthermore, if it is desirable for each of the simulated series impedances to consist of a network such as an inductor in parallel with a resistor, such networks may be afforded by connecting a resistor and a capacitor in series between feedback network input 24*a* and feedback network output 24*b*, as shown in FIG. 1*c*.

Similarly, in the event that it is desirable for the shunt simulated impedance to consist of an inductor, such simulated inductor may be afforded by connecting a capacitor between ground and the input and output of feedback network 27, as shown in FIG. 1*d*. Similarly, a simulated capacitor may be made to appear across the transmission line by connecting an inductor between ground and the input and output of feedback network 27, as shown in FIG. 1*e*. Furthermore, if it is desirable for the simulated impedance to comprise a network such as a simulated resistor in series with the simulated inductor, such may be provided by connecting a resistor between feedback network input 27*a* and feedback network output 27*b* and by connecting a capacitor between ground and feedback network input 27*a* or feedback network output 27*b*, as shown in FIG. 1f.

In the present embodiment, it is contemplated that current sensing means 23 have a low input impedance between input 23*a* and ground and have a low output impedance between output 23*b* and ground. The low input impedance condition assures that sensing means 23 does not substantially affect the flow of the line current being sensed, the latter flowing from the virtual ground at output 13*c* of voltage generator 13, through winding 14*a*, to the virtual ground at input 23*a* of sensor 23. The low output impedance condition assures that the input signal applied to voltage generator 13 accurately reflects the amplitude of the signal current being sensed. It will be understood that current sensing means of any suitable design that meets criteria may be utilized in the circuit of FIG. 1.

On the other hand, it is contemplated that voltage sensing means 26 have a high input impedance between inputs 26*a* and 26*b* thereof and a low output impedance between output 26*c* and ground. The high input impedance condition assures that voltage sensing means 26 does not draw any substantial sensing current from the transmission line. The low output impedance condition assures that the signal applied to the input of current generator 16 accurately reflects the sensed signal voltage. It will be understood that voltage sensing means of any suitable design that meets these criteria may be utilized in the circuit of FIG. 1.

When the signal at feedback network output 24*b* is applied to generator input 13*b* as, for example, by the conduction of a suitable switch S2, here shown as a field-effect transistor, generator 13 establishes across transformer winding 14*a* an impedance simulating voltage which is 180° out of phase with the signal at generator input 13*b*. On the other hand, when the signal at feedback network output 24*b* is applied to generator input 13*a* as, for example, by a suitable switch S1, generator 13 establishes across winding 14*a* a voltage which is in phase with the signal at generator input 13*a*. Thus, generator input 13*a* serves as a noninverting input and generator input 13*b* serves as an inverting input.

Similarly, when the signal at output 27*b* of voltage feedback network 27 is applied to current generator 16*a* as, for example, by the conduction of suitable switch S1′, generator 16 produces an upward flowing or positive impedance simulating current in conductor 18 and an equal but opposite downward flowing or negative impedance simulating current in conductor 19. When, on the other hand, the signal at feedback network output 27*b* is applied to current generator input 16*b* as, for example, by the conduction of a suitable switch S2′, generator 16 produces a downward flowing or negative current in conductor 18 and an equal but opposite upward flowing or positive current in conductor 19. Thus, generator input 16*a* serves as a noninverting input and input 16*b* serves as an inverting input.

Depending upon the phase relationships between the input and output signals of voltage generator 13, series coupling transformer 14, current sensing means 23 and current feedback network 24, the simulated series impedance may be either a simulated positive impedance or a simulated negative impedance. Assuming that the windings of transformer 14 are connected as shown in FIG. 1 and that the signal at the output of current sensor 23 is in phase with the signal at the input thereof, thee application of the feedback signal at network output 24*b* to inverting generator input 13*b* causes positive impedances to appear in series with the transmission line. Assuming, on the other hand, that the feedback signal at network output 24*b* is applied to non-inverting generator input 13*a*, negative simulated impedances will appear in series with the transmission line.

It will be understood that if current sensing means 23 did produce a 180° phase shift between its input and output signals, the application of the feedback signal at 24*b* to non-inverting generator input 13*a* would produce positive series simulated impedances and that the application of the feedback signal at 24*b* to inverting generator input 13*b* would produce negative series simulated impedances. Thus, the phase relationship between the input and output signals of the networks within the loop comprising networks 13, 14, 23 and 24, rather than the generator input to which the voltage feedback signal is applied, determines the sign of the simulated series impedances.

In the present embodiment, it is contemplated that the generator output voltage which results from the application of a given feedback signal to amplifier input 13*a* be equal in magnitude to the generator output voltage which is produced by the application of that same feedback signal to generator input 13*b*. Accordingly, if positive series impedances are being simulated as a result of conduction through switch S2 and switch S1 is simultaneously rendered conducting, the impedance simulating voltage at generator output 13*c* will fall to zero, with the result that the values of the simulated impedances between terminals T1, T2, T3 and T4 will also fall to zero. A similar disappearance of the simulated series impedances will occur if switch S2 is rendered conducting at a time when the application of a feedback signal to generator input 13*a* through switch S1 is causing simulated impedances to appear in series with the line. Thus, generator input 13*b* serves as a cancelling input when input 13*a* is being used as an impedance simulating input and input 13*a* serves as a cancelling input when input 13*b* is being used as an impedance simulating input.

In view of the foregoing, it will be seen that by suitably controlling the conduction of switches S1 and S2, the simulated series impedances may be changed from positive values to negative values or vice-versa or may be inserted or removed at will. If, however, only positive series impedance simulation or only negative series impedance simulation is necessary, switches S1 and S2 may be eliminated and feedback network output 24*b* may be directly and permanently connected to the generator input which simulates impedances of the desired sign.

It will be understood that by suitably controlling the conduction of switches S1′ and S2′, the shunt impedance simulating circuitry comprising networks 26, 27 and 16 may produce a positive shunt simulated impedance, a negative shunt simulated impedance or the absence of a simulated shunt impedance. Furthermore, by controlling the conduction of switches S1′ and S2′ in relation to the conduction of switches S1 and S2, the simulated shunt impedance may be either positive or negative while the simulated series impedance is respectively negative or positive.

In the present embodiment, generator 13 includes operational amplifiers 29 and 30 each of which has a non-inverting input A, an inverting input B and an output C. Amplifier 30 serves to energize primary winding 14*a* with an impedance simulating voltage which varies negatively with changes in the input voltage at generator input 13*b*. Operational amplifiers 29 and 30, taken together, serve to energize winding 14*a* with an impedance simulating voltage which varies positively with changes in the input voltage at driver input 13*a*. The amount of change in the impedance simulating voltage for a given change in generator input voltage is determined by the relative magnitudes of gain control resistors such as amplifier input resistor 32 and amplifier feedback resistors 33 and 34.

In the present embodiment, current generator 16 includes operational amplifiers 36, 37 and 38, output current sensing resistors 40 and 41, current feedback resistors 43, 44, 45 and 46 and operational amplifier feedback resistors 48 and 49. In the environment of current generator 16, operational amplifiers 36 and 37 operate as current sources to establish in output conductors 19 and 18, respectively, complementary impedance simulating currents the magnitudes of which are not substantially affected by the impedances of the transmission line into which those currents are introduced. This current source characteristic results from the action of current feedback resistors 43, 44, 45 and 46 which prevent the current in current sensing resistors 40 and 41 from deviating from the values set by the input signals at generator inputs 16*a* and 16*b*. Circuitry of this type is described, in detail, in the copending application of Frederick J. Kiko, Ser. No. 301,968, entitled Controllable Current Source, now abandoned and in a similarly titled divisional application based thereon, Ser. No. 396,225, filed Sept. 11, 1973.

Figure 2:
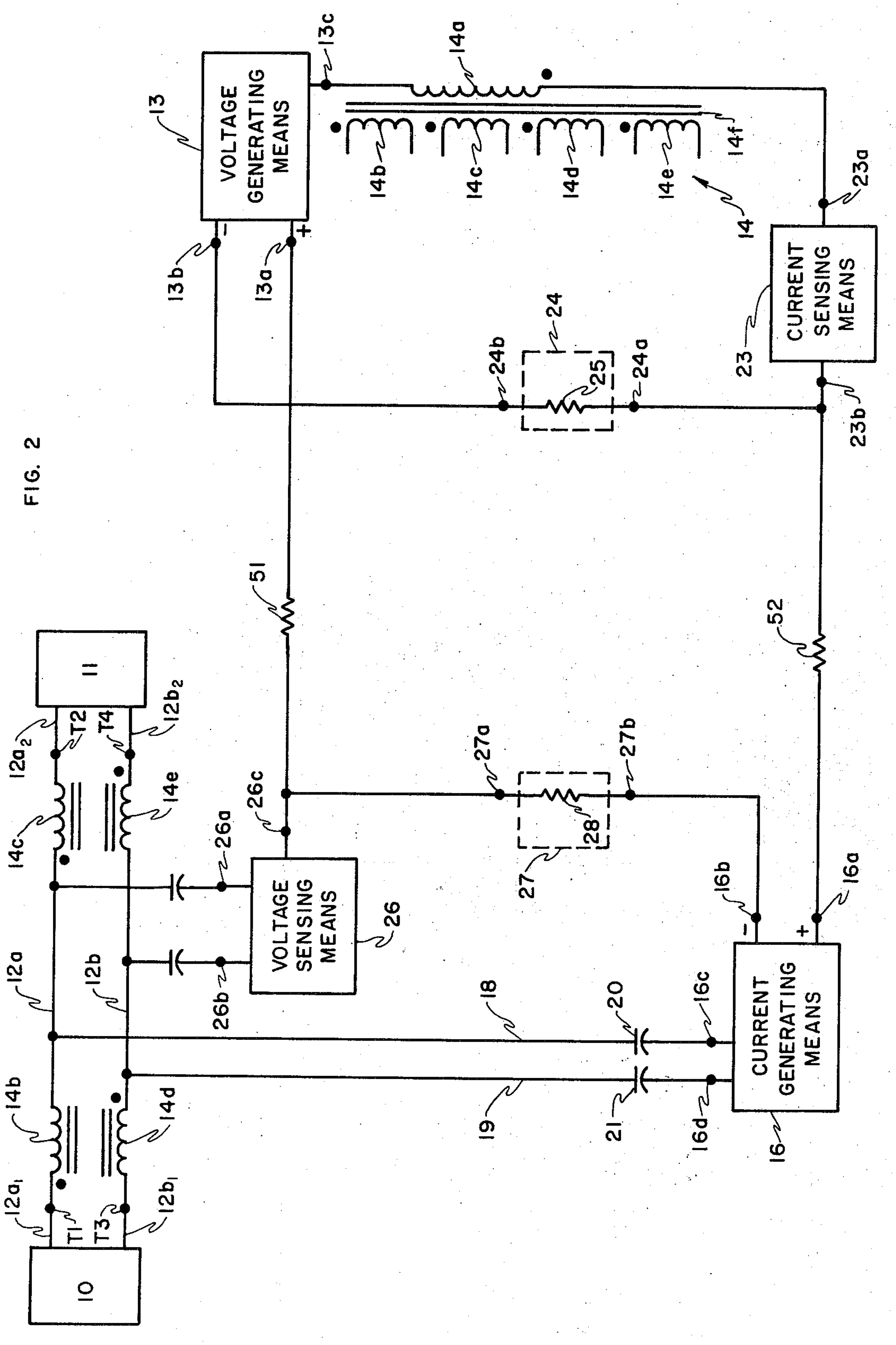
FIG. 2 is a block-schematic diagram showing a modified form of the circuit of the invention and, FIG. 3 is a block-schematic diagram showing a still further modified embodiment of the circuit of the invention.

In the event that the impedance simulating circuitry of FIG. 1 is to be utilized as an echo suppressor, that is, a circuit which provides loss for transmission therethrough in one direction and no loss for transmission therethrough in the opposite direction, the circuit of FIG. 1 may be modified as shown in FIG. 2. The circuit of FIG. 2 is in many respects similar to the circuit of FIG. 1 and like functioning parts are similarly numbered.

In the circuit of FIG. 2, current feedback resistor 25 is connected between current sensor output 23*b* and inverting voltage generator input 13*b* to simulate the presence of positive series resistors between terminal pairs T1–T2 and T3–T4 and voltage feedback resistor 27 is connected between voltage sensor output 26*c* and inverting current generator input 16*b* to simulate the presence of a positive resistance between conductors 12*a* and 12*b*. The simultaneous presence of these simulated resistors simulates the presence of an attenuator pad and thereby provides loss to signal transmission in both directions through the transmission line. In addition, a gain control resistor 51 is connected between voltage sensor output 26*c* and non-inverting voltage generator input 13*a* and a gain control resistor 52 is connected between current sensor output 23*b* and non-inverting current generator input 16*a*. As will be described more fully presently, the simultaneous presence of gain control resistors 51 and 52 assures that the circuit of FIG. 2 provides gain for signal transmission in one direction and an equal loss for transmission in the opposite direction. Accordingly, it will be seen that if the gain which resistors 51 and 52 provide to transmission in one direction is made equal the loss provided to transmission in that direction by the simulated attenuator pad, there will be no net gain or loss for transmission in that direction. On the other hand, the loss which resistors 51 and 52 provide to transmission in the opposite direction adds to the loss provided to transmission in that direction by the simulated attenuator pad. Thus, if the value of gain control resistors 51 and 52 are suitably related to the values of feedback resistors 25 and 27, the circuit of FIG. 2 will provide no net loss for transmission in one direction and a net loss for transmission in the opposite direction and thereby operate as an echo suppressor.

The manner in which gain control resistors 51 and 52 produce gain for transmission in one direction and loss for transmission in the other direction will now be described. Assuming that transmitting station 10 is transmitting a signal which renders line conductor $12a_1$ positive from line conductor $12b_1$, voltage sensor input 26*a* will be positive from 26*b* thereof, causing voltage sensor output 26*c* to be positive from ground. This positive voltage, in turn, causes positive voltages to appear at voltage generator input 13*a* and voltage generator output 13*c*. Under these conditions, the non-dotted ends of windings 14*a*, 14*b*, 14*c*, 14*d* and 14*e* will be rendered positive from the respective dotted ends thereof. Since the latter voltages tend to increase the amplitude of signal transmission from station 10, it will be seen that resistor 51 tends to cancel the signal attenuating effect of feedback resistors 25 and 28 and thereby reduce the loss for transmission from station 10.

Assuming, on the other hand, that transmitting station 11 transmits a signal which renders conductor $12a_2$ positive from conductors $12b_2$, voltage sensor input 26*a* will be positive from input 26*b* causing generator 13 to render the non-dotted ends of windings 14*a*, 14*b*, 14*c*, 14*d* and 14*e* positive with respect to the respective dotted ends thereof. Since voltages of the latter polarity oppose signal transmission from station 11, it will be seen that resistor 51 tends to increase the signal attenuating effect of feedback resistors 25 and 28 and thereby increase the loss for transmission from station 11.

Similarly, gain control resistor 52 opposes the signal attenuating effect of feedback resistors 25 and 28 to reduce the loss for transmission from station 10 and adds to the signal attenuating affect of feedback resistors 25 and 28 to increase the loss for transmission from station 11. Accordingly, it will be seen that for suitable values of gain control resistors 51 and 52 the signal attenuating effect of feedback resistors 25 and 28 may be reduced to zero for transmission from station 10 and the signal attenuating effect of feedback resistors 25 and 28 may be doubled for transmission from station 11. Thus, gain control resistors 51 and 52 cooperate with feedback resistors 25 and 28 to impart to the circuit of FIG. 2 an echo suppressing characteristic.

It will be understood that if gain control resistors 51 and 52 were connected to voltage generator input 13*b* and current generator input 16*b*, respectively, the circuit of FIG. 2 would afford no net gain or loss to transmission from station 11 and would afford a net loss for transmission from station 10. Alternatively, if resistor 51 is connected to generator inputs 13*a* and 13*b* through switches such as S1 and S2 of FIG. 1, and if resistor 52 is connected to current generator inputs 16*a* and 16*b* through switches such as S1' and S2' of FIG. 1, controlling the pattern of conduction through the switches causes the circuit of FIG. 2 to exhibit a reversible echo suppressing characteristic, that is, a characteristic in which loss is provided to transmission in one direction for a first pattern of switch conduction and in which loss is provided to transmission in the other direction for a second pattern of switch conduction.

Figure 3:
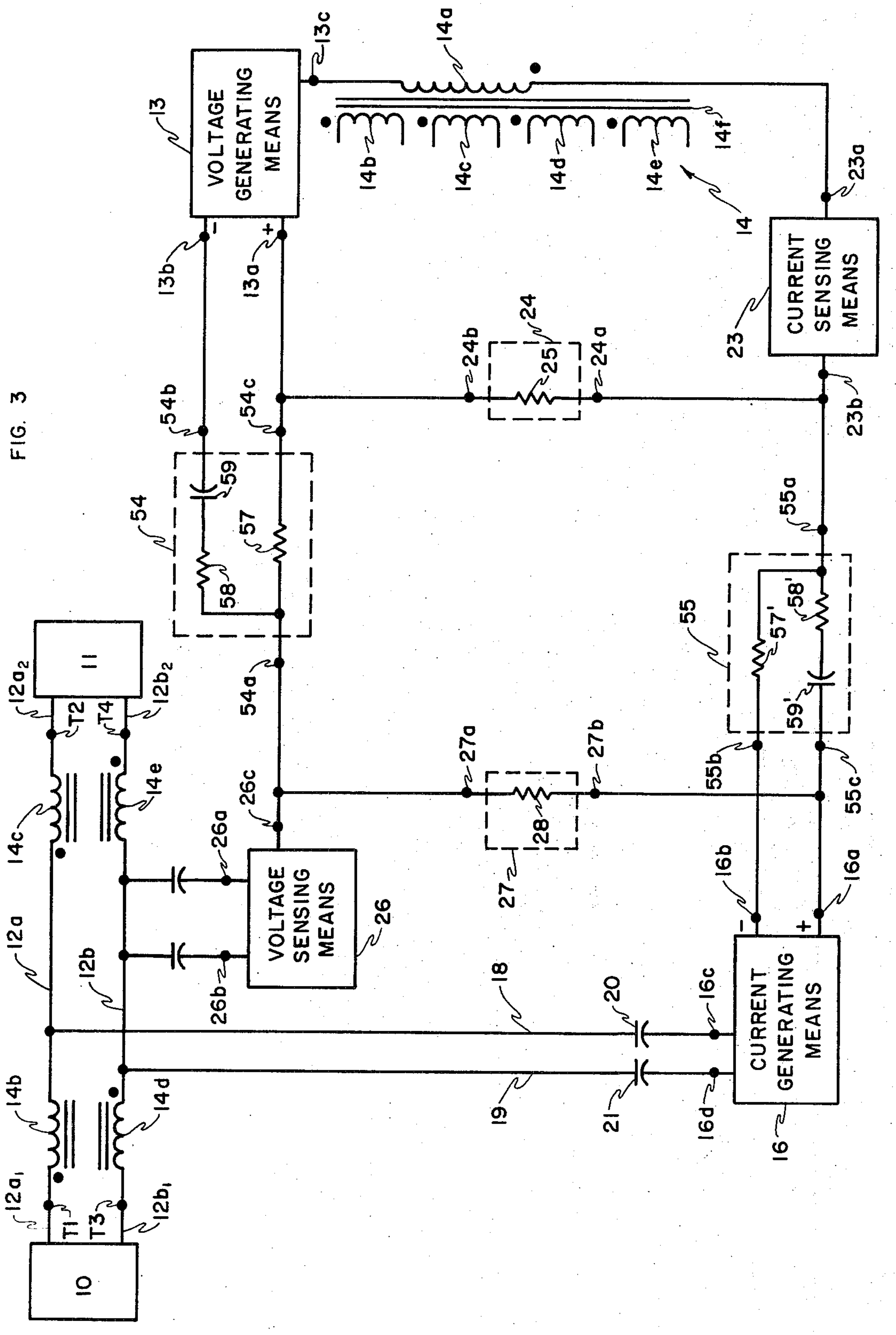

As previously described, the utilization of simulated series and shunt negative resistances as a repeater generally requires line-build-out circuitry or the like for building out the impedance of the transmission line to the impedance of the repeater. With the present invention, the desired series and shunt negative impedances and the desired impedance matching may be afforded by a single circuit. One exemplary embodiment of such a circuit is shown in FIG. 3. The circuit of FIG. 3 is in many respects similar to the circuit of FIG. 1 and like functioning parts are similarly numbered.

In the circuit of FIG. 3, feedback resistors 25 and 28 afford negative series and shunt impedances in the manner described previously in connection with the circuit of FIG. 1. At the same time, as will be described more fully presently, an impedance compensating or matching network 54 having an input 54*a* and outputs 54*b* and 54*c* and an impedance compensating or matching network 55 having an input 55*a* and outputs 55*b* and 55*c*, cause generators 13 and 16 to generate and introduce into the transmission line voltages and currents which match the impedances of the circuit of the invention to the impedances of the transmission line. More specifically, impedance matching networks 54 and 55 match the impedances looking in opposite directions at terminal pair T1–T3 and match the impedances looking in opposite directions at terminal pair T2–T4. Furthermore, impedance matching networks 54 and 55, are adapted to produce the desired impedance matching not only at a particular frequency, but also at each frequency in the band of frequencies to be transmitted through the transmission line.

When impedance compensating network 54 applies the energizing signal at sensor output 26*b* to generator input 13*a*, generator 13 generates and introduces into the line a voltage which transforms the terminal impedance looking to the right at terminal pair T1–T3 downward, below the line impedance looking to the right at terminal pair T2–T4, and which transforms the terminal impedance looking to the left at terminal pair T2–T4 upward, above the line impedance looking to the left at terminal pair T1–T3. Under these conditions, generator 13 also produces a gain for transmission from station 10 and a loss for transmission from station 11, this being accomplished in the manner described previously in connection with resistor 51 of FIG. 2. Similarly, when network 54 applies an energizing signal to generator input 13*b*, generator 13 generates and introduces into the line a voltage which transforms the terminal impedance looking to the right at terminal pair T1–T3 upward, above the line impedance looking to the right at terminal pair T2–T4 and which transforms the terminal impedance looking to the left at terminal pair T2–T4 downward, below the line impedance looking to the left at terminal pair T1–T3. Under the latter conditions, generator 13 produces a gain for transmission from station 11 and a loss for transmission from station 10.

It will be understood that if compensating network 54 simultaneously applies to generator inputs 13*a* and 13*b* different energizing signals having amplitudes which vary as respective functions of frequency, generator 13 may lower a given terminal impedance over one portion of the transmission band and may raise that same terminal impedance over another portion of the transmission band, depending upon the relative amplitudes of the energizing signals at generator inputs 13*a* and 13*b* over those different portions of the transmission band.

When impedance compensating network 55 applies the energizing signal at sensor output 23*b* to generator input 16*b*, generator 16 generates and introduces into the line a current which transforms the terminal impedance looking to the right at terminal pair T1–T3 downward, below the line impedance looking to the right at terminal pair T2–T3, and which transforms the terminal impedance looking to the left at terminal pair T2–T4 upward, above the line T4, looking to the left at terminal pair T1–T3. Under these conditions, generator 16 produces a loss for transmission from station 10 and a gain for transmission from station 11. Similarly, when network 55 applies an energizing signal to generator input 16*a*, generator 16 generates and introduces into the line a current which transforms the terminal impedance looking to the right at terminal pair T1–T3 upward, above the line impedance looking to the right at terminal pair T2–T4 and transforms the terminal impedance looking to the left at terminal pair T2–T4 downward, below the line impedance looking to the left at terminal pair T1–T3. Under the latter conditions, generator 16 produces a gain for transmission from station 10 and a loss for transmission from station 11, this being accomplished in the manner described in connection with resistor 52 of FIG. 2.

It will be understood that if network 55 simultaneously applies to generator inputs 16*a* and 16*b* different energizing signals having amplitudes which vary as respective functions of frequency, generator 16 can raise a given terminal impedance over one portion of the transmission band and lower that same terminal impedance over another portion of the transmission band, depending upon the relative amplitudes of the energizing signals applied to generator inputs 16*a* and 16*b* over those different portions of the transmission band.

In accordance with the present invention, it is contemplated that generators 13 and 16 produce aiding impedance transformations and at the same time produce cancelling gains. When, for example, it is desirable to provide a downward impedance transformation at terminal pair T1–T3 without affecting the gain for transmission from station 10, this may be accomplished by arranging network 54 to apply an energizing signal to generator input 13*a* and by arranging impedance compensating network 55 to apply an energizing signal to generator input 16*b*. Under these conditions, both generator 13 and generator 16 produce a downward impedance transformation at terminal pair T1–T3 and, at the same time, produce cancelling gains and losses to signal transmission from station 10. Under these same conditions, generators 13 and 16 both transform upward the impedance looking to the left at terminal pair T2–T4 and, at the same time, produce cancelling gains and losses to signal transmission from station 11.

Similarly, arranging compensating network 54 to apply an energizing signal to generator input 13*b* and arranging compensating network 55 to simultaneously apply an energizing signal to generator input 16*a*, causes both generators to produce an upward terminal impedance transformation at terminal pair T1–T3, a downward terminal impedance transformation at terminal pair T2–T4, and, at the same time, causes these generators to produce cancelling gains and losses both for transmission from station 10 and transmission from station 11.

Furthermore, compensating network 54 may be arranged to apply to both inputs of generator 13 different energizing signals having amplitudes which vary as respective functions of frequency and compensating network 55 may simultaneously be arranged to apply to both inputs of generator 16 different energizing signals having amplitudes which vary as respective functions of frequency. Where this is done, the circuit of FIG. 3 can produce upward and downward terminal impedance transformations at terminal pair T1–T3 over respective first and second portions of the transmission band and can produce downward and upward terminal impedance transformations at terminal pair T2–T4 over those same respective first and second portions of the transmission band. In addition, if the net energizing signal applied to generator 13 is equal in magnitude but opposite in sign to the net energizing signal applied to generator 16, all impedance transformations conditions are achieved with no net signal gain or loss for transmission from stations 10 and 11 over the transmission band. Thus, compensating networks 54 and 55 can cause the terminal impedances of the circuit of the invention to vary in any desired fashion with frequency, as, for example, in the manner necessary to match the line and terminal impedances at both terminal pairs, without affecting the gain or loss for signal transmission in either direction.

Assuming, for example, that the impedance of the transmission line looking into conductor pair $12a_1$–$12b_1$ is equal to 900 ohms at each frequency in the transmission band and that the impedance looking into conductor pair $12a_2$–$12b_2$ varies from a value of 1,200 ohms at 200 hertz to a value of 200 ohms at 3,000 hertz, the desired impedance matching may be produced by utilizing the resistor-capacitor impedance matching networks shown in FIG. 3. In the present embodiment, impedance matching network 54 includes a first branch or network which comprises a resistor 57 and which has an impedance which varies in a first manner with frequency and a second branch or network which comprises a serially connected resistor 58 and capacitor 59 and which has an impedance which varies in a second manner of frequency. Similarly, impedance matching network 55 includes a first branch or network which comprises a resistor 57' and which has an impedance which varies in a first manner of frequency and a second branch which comprises a serially connected resistor 58' and capacitor 59' and which has an impedance which varies in a second manner with frequency.

Resistors 57 and 57' are desirably substantially equal in magnitude and are connected to opposite inputs of voltage generator 13 and current generator 16. Similarly, resistor 58 and capacitor 59 are desirably substantially equal to resistor 58' and capacitor 59', respectively, and are connected to the remaining opposite inputs of voltage generator 13 and current generator 16. This equality of impedances and oppositeness of connections assures that the net energizing signals which impedance matching networks 54 and 55 apply to generators 13 and 16 remain equal and opposite over the transmission band and thereby produce the desired impedance matching affect without substantially affecting the amplitude of signal transmission through the transmission line.

The operation of impedance matching networks 54 and 55 will now be described. At the low end of the transmission band, the high impedance of capacitor 59 causes the amplitude of the energizing signal which sensor 26 applies to generator input 13*a* through network 54 to be greater than the amplitude of the energizing signal which sensor 26 applies to generator input 13*b* through network 54 and thereby causes a net positive energizing signal to control generator 13. At the same time, the high impedance of capacitor 59' causes the amplitude of the energizing signal which sensor 23 applies to generator input 16*b* through network 55 to be greater than the amplitude of the energizing signal which sensor 23 applies to generator input 16*a* through network 55 and thereby causes a net negative energizing signal to control generator 16. For particular values of these net energizing signals, the 1,200 ohm line impedance looking into conductor pair $12a_2$–$12b_2$ will be transformed downward to appear at terminals T1–T3 as a transformed terminal impedance equal to the 900 ohm line impedance looking into conductor pair $12a_1$–$12b_1$. At the same time, the 900 ohm line impedance looking into conductor pair $12a_1$–$12b_1$ will be transformed upward to appear at terminals T2–T4 as a transformed terminal impedance equal to the 1,200 ohm line impedance looking into conductor pair $12a_2$–$12b_2$. In addition, the equality of the resistances and capacitances of networks 54 and 55 and oppositeness of the connections thereof to generators 13 and 16 assures that these impedance transformations occur without producing a net gain or loss for transmission in either direction through the transmission line.

At the upper end of the transmission band, however, the low impedance of capacitor 59 causes the amplitude of the energizing signal which sensor 26 applies to generator input 13*b* through network 54 to be greater than the amplitude of the energizing signal which sensor 26 applies to generator input 13*a* through network 54 and thereby causes a net negative energizing signal to control generator 13. At the same time, the low impedance of capacitor 59' causes the amplitude of the energizing signal which sensor 23 applies to generator input 16*a* through network 55 to be greater than the amplitude of the energizing signal which sensor 23 applies to generator input 16*b* through network 55 and thereby causes a net positive energizing signal to control generator 16. For particular values of these net energizing signals, the 200 ohm line impedance looking into conductor pair $12a_2$–$12b_2$ will be transformed upward to appear at terminals T1–T3 as a transformed terminal impedance which is substantially equal to the 900 ohm line impedance looking into conductor pair $12a_1$–$12b_1$. At the same time, the 900 ohm line impedance looking into conductor pair $12a_1$–$12b_1$ will be transformed downward to appear at terminals T2–T4 as a transformed terminal impedance which is substantially equal to the 200 ohm line impedance looking into conductor pair $12a_2$–$12b_2$. In addition, the equality of the resistances and capacitances of networks 54 and 55 and oppositeness of the connections thereof to generators 13 and 16 assures that these impedance transformations occur without producing a net gain or loss for transmission in either direction through the transmission line.

In view of the foregoing, it will be seen that the frequency responsive character of impedance compensating networks 54 and 55 allows the circuit of FIG. 3 to transform the impedance of the transmission line upward to afford impedance matching at one end of the transmission band and at the same time transform the impedance of the transmission line downward to afford impedance matching at the other end of the transmission band. It will be understood that for suitable values of resistors 57 and 57', resistors 58 and 58' and capacitors 59 and 59', the desired impedance matching characteristic may be afforded not only at the ends of the transmission band but for substantially all frequencies in between. In addition, arranging the gains and losses introduced by generators 13 and 16 to remain equal and opposite assures that the desired impedance matching is afforded without affecting the amplitude of signal transmission. Thus, impedance matching networks 54 and 55 establish the impedance matching necessary to allow the utilization of simulated series and shunt negative impedances as a repeater.

In view of the foregoing it will be seen that an impedance simulating circuit constructed in accordance with the present invention is adapted to provide resistive or reactive simulated impedances either in series or in shunt with a transmission line and is adapted to provide such simulated impedance as positive impedances, negative impedances or a combination thereof. In addition, the circuit of the invention is adapted to provide such simulated impedances in the presence of directional gain and impedance matching.

It will be understood that the above described embodiments are for illustrative purposes only and may be changed or modified without departing from the spirit and scope of the present invention as set forth in the appended claims.

What is claimed is:

1. In an apparatus for simulating the presence of impedance in a transmission line, the combination of, voltage generating means for generating an impedance simulating voltage, said voltage generating means having simulating input means and output means, series connecting means for applying the voltage at the output means of said voltage generating means in series with the transmission line, current sensing means for establishing a signal which varies substantially only in accordance with a signal current through the transmission line, means for electrically connecting said current sensing means to the transmission line, current feedback means for controlling the magnitude and character of the simulated impedance to be introduced in series with the transmission line and means for connecting said current feedback means to said current sensing means and to the simulating input means of said voltage generating means, the phase relationships between said generating means, said connecting means, said sensing means and said feedback means being selected to afford a positive simulated impedance.

2. An apparatus for simulating the presence of impedance in a transmission line as set forth in claim 1, including current generating means for generating an impedance simulating current, said current generating means having simulating input means and output means, shunt connecting means for applying the current at the output means of said current generating means in shunt with the transmission line, voltage sensing means for establishing a signal which varies substantially only in accordance with a signal voltage across the transmission line, means for electrically connecting said voltage sensing means to the transmission line, voltage feedback means for controlling the magnitude and character of the simulated impedance to be introduced in shunt with the transmission line and means for connecting said voltage feedback means to said voltage sensing means and to the simulating input means of said current generating means, the phase relationship between said current generating means, said shunt connecting means, said voltage sensing means and said voltage feedback means being selected to afford a positive simulated impedance.

3. In an apparatus for simulating the presence of impedance in a transmission line, the combination of, current generating means for generating an impedance simulating current, said current generating means having simulating input means and output means, shunt connecting means for applying the current at the output means of said current generating means in shunt with the transmission line, voltage sensing means for establishing a signal which varies substantially only in accordance with a signal voltage across the transmission line, means for electrically connecting said voltage sensing means to the transmission line, voltage feedback means for controlling the magnitude and character of the simulated impedance to be introduced in shunt with the transmission line and means for connecting said voltage feedback means to said voltage sensing means and to the simulating input means of said current generating means, the phase relationship between said generating means, said connecting means, said sensing means and said feedback means being selected to afford a positive simulated impedance.

4. In an apparatus for simulating the presence of impedance in a transmission line, the combination of, voltage generating means for generating an impedance simulating voltage, said voltage generating means having simulating input means and output means, series connecting means for applying the voltage at the output means of said voltage generating means in series with the transmission line, current sensing means for establishing a signal which varies substantially only in accordance with a signal current through the transmission line, means for electrically connecting said current sensing means to the transmission line, current feedback means for controlling the magnitude and character of the simulated impedance to be introduced in series with the transmission line and means for connecting said current feedback means to said current sensing means and to the simulating input means of said voltage generating means, the phase relationship between said generating means, said connecting means, said sensing means and said feedback means being selected to afford a negative simulated impedance.

5. An apparatus for simulating the presence of impedance in a transmission line as set forth in claim 4, including current generating means for generating an impedance simulating current, said current generating means having simulating input means and output means, shunt connecting means for applying the current at the output means of said current generating means in shunt with the transmission line, voltage sensing means for establishing a signal which varies substantially only in accordance with a signal voltage across the transmission line, means for electrically connecting said voltage sensing means to the transmission line, voltage feedback means for controlling the magnitude and character of the simulated impedance to be introduced in shunt with the transmission line and means for connecting said voltage feedback means to said voltage sensing means and to simulating input means of said current generating means, the phase relationship between said current generating means, said shunt connecting means, said voltage sensing means and said voltage feedback means, said voltage sensing means and said voltage feedback means being selected to establish a negative simulated impedance.

6. In an apparatus for simulating the presence of impedance in a transmission line, the combination of, current generating means for generating an impedance simulating current said current generating means having simulating input means and output means, shunt connecting means for applying the current at the output means of said current generating means in shunt with the transmission line, voltage sensing means for establishing signal which varies substantially only in accordance with a signal voltage across the transmission line, means for electrically connecting said voltage sensing means to the transmission line, voltage feedback means for controlling the magnitude and character of the simulated impedance to be introduced in shunt with the transmission line and means for connecting said voltage feedback means to said voltage sensing means and to the simulating input means of said current generating means, the phase relationship between said generating means, said connecting means, said sensing means and said feedback means being selected to afford a negative simulated impedance.

7. In an apparatus for simulating the presence of impedance in a transmission line, the combination of, voltage generating means for generating an impedance simulating voltage, said voltage generating means having input means and output means, series connecting means for applying the voltage at the output means of said voltage generating means in series with the transmission line, current sensing means for establishing a signal which varies in accordance with a signal current through the transmission line, means for electrically connecting said current sensing means to the transmission line, current feedback means for controlling the magnitude and character of the simulated impedance to be introduced in series with the transmission line, means for connecting said current feedback means to said current sensing means and to the input means of said voltage generating means, voltage sensing means for establishing a signal which varies in accordance with a signal voltage across the transmission line, means for electrically connecting said voltage sensing means to the transmission line, and means for connecting said voltage sensing means to the input means of said voltage generating means.

8. In an apparatus for simulating the presence of impedance in a transmission line, the combination of, current generating means for generating an impedance simulating current, said current generating means having input means and output means, shunt connecting means for applying the current at the output means of said current generating means in shunt with the transmission line, voltage sensing means for establishing a signal which varies in accordance with a signal voltage across the transmission line, means for electrically connecting said voltage sensing means to the transmission line, voltage feedback means for controlling the magnitude and character of the simulated impedance to be introduced in shunt with the transmission line, means for connecting said voltage feedback means to said voltage sensing means and to the input means of said current generating means, current sensing means for establishing a signal which varies in accordance with a signal current through the transmission line, means for electrically connecting said current sensing means to the transmission line, and means for connecting said current sensing means to the input means of said current generating means.

9. In an apparatus for simulating the presence of impedance in a transmission line, the combination of, voltage generating means for generating an impedance simulating voltage, said voltage generating means having input means and output means, current generating means for generating an impedance simulating current, said current generating means having input means and output means, series connecting means for applying the voltage at the output means of said voltage generating means in series with the transmission line, shunt connecting means for applying the current at the output means of said current generating means in shunt with the transmission line, current sensing means for establishing a signal which varies in accordance with a signal current through the transmission line, means for electrically connecting said current sensing means to the transmission line, voltage sensing means for establishing a signal which varies in accordance with a signal voltage across the transmission line, means for electrically connecting said voltage sensing means to the transmission line, current feedback means for controlling the magnitude and character of the simulated impedance to be introduced in series with the transmission line, voltage feedback means for controlling the magnitude and character of the simulated impedance to be introduced in shunt with the transmission line, means for connecting said current feedback means to said current sensing means and to the input means of said voltage generating means to establish a positive simulated impedance in series with the transmission line, means for connecting said voltage feedback means to said voltage sensing means and to the input means of said current generating means to establish a positive simulated impedance in shunt with the transmission line, means for connecting said voltage sensing means to the input means of said voltage generating means to introduce a signal increasing voltage in series with the transmission line for one direction of transmission therethrough, and means for connecting said current sensing means to the input means of said current generating means to introduce a signal aiding current in shunt with the transmission line for said one direction of transmission therethrough.

10. An apparatus as set forth in claim 9 in which the signal gain resulting from said signal increasing voltage and signal increasing current is substantially equal to the signal loss resulting from the presence of said series and shunt simulated impedances.

11. In an apparatus for simulating the presence of impedance in a transmission line, the combination of, voltage generating means for generating a voltage in series with the transmission line, said voltage generating means having simulating input means, cancelling input means and output means, current generating means for generating a current in shunt with the transmission line, said current generating means having simulating input means, cancelling input means and output means, means for applying the voltage at the output means of said voltage generating means in series with the transmission line, means for applying the current at the output means of said current generating means in shunt with the transmission line, current sensing means for establishing a signal which varies in accordance with a signal current through the transmission line, means for electrically connecting said current sensing means to the transmission line, voltage sensing means for establishing a signal which varies in accordance with a signal voltage across the transmission line, means for electrically connecting said voltage sensing means to the transmission line, current feedback means for controlling the magnitude and character of the simulated impedance to be introduced in series with the transmission line, voltage feedback means for controlling the magnitude and character of the simulated impedance to be introduced in shunt with the transmission line, means for connecting said current feedback means between said current sensing means and the simulating input means of said voltage generating means, means for connecting said voltage feedback means between said voltage sensing means and the simulating input means of said current generating means, series control means for causing said voltage generating means to introduce a signal increasing voltage in series with the transmission line, shunt control means for causing said current generating means to introduce a signal increasing current in shunt with the transmission line, means for connecting said series control means between said voltage sensing means and one of the input means of said voltage generating means, means for connecting said shunt control means between said current sensing means and one of the input means of said current generating means, the signal gain resulting from said signal increasing voltage and signal increasing current being substantially equal to the signal loss resulting from the presence of said series and shunt simulated impedances for one direction of transmission through the transmission line.

12. In an apparatus for simulating the presence of impedance in a transmission line, the combination of, voltage generating means for introducing a voltage in series with the transmission line, said voltage generating means having simulating input means, cancelling input means and output means, current generating means for introducing a current in shunt with the transmission line, said current generating means having simulating input means, cancelling input means and output means, means for applying the voltage at the output means of said voltage generating means in series with the transmission line, means for applying the current at the output means of said current generating means in shunt with the transmission line, current sensing means for establishing a signal which varies in accordance with a signal current through the transmission line, means for electrically connecting said current sensing means to the transmission line, voltage sensing means for establishing a signal which varies in accordance with a signal voltage across the transmission line, means for electrically connecting said voltage sensing means to the transmission line, current feedback means for controlling the magnitudee and character of the simulated impedance to be introduced in series with the transmission line, voltage feedback means for controlling the magnitude and character of the simulated impedance to be introduced in shunt with the transmission line, means for connecting said current feedback means to said current sensing means and to the simulating input means of said voltage generating means, means for connecting said voltage feedback means to said voltage sensing means and to the simulating input means of said current generating means, series impedance compensating means for varying the relative amplitudes of the signals at the simulating and cancelling input means of said voltage generating means as functions of frequency, shunt impedance compensating means for varying the relative amplitudes of the signals at the simulating and cancelling input means of said current generating means as functions of frequency, said functions of frequency being selected to substantially match the impedances looking into the apparatus to the impedances looking into the transmission line.

13. An apparatus as set forth in claim 12 in which the phase relationship between said voltage generating means, said series connecting means, said current sensing means and said current feedback means are selected to establish a negative series simulated impedance and in which the phase relationship between said current generating means, said shunt connecting means, said voltage sensing means and said voltage feedback means are arranged to establish a negative shunt simulated impedance.

14. An apparatus as set forth in claim 12 in which said series impedance compensating means includes first and second series networks having impedances which vary as respective first and second functions of frequency, means for connecting said first series network to said voltage sensing means and to the simulating input means of said voltage generating means, means for connecting said second series network to said voltage sensing means and to the cancelling input means of said voltage generating means, and in which said shunt impedance compensating means includes first and second shunt networks having impedances which vary as respective first and second functions of frequency, means for connecting said first shunt network to said current sensing means and to the cancelling input means of said current generating means and means for connecting said second shunt network to said current sensing means and to the simulating input means of said current generating means.

15. In an apparatus for simulating the presence of impedance in a transmission line, the combination of, voltage generating means for generating a voltage in series with the transmission line, said voltage generating means having input means and output means, current generating means for generating a current in shunt with the transmission line, said current generating means having input means and output means, means for applying the voltage at the output means of said voltage generating means in series with the transmission line, means for applying the current at the output means of said current generating means in shunt with the transmission line, means for controlling the amplitude of the signal at the input means of said voltage generating means in accordance with the magnitude of a signal current through the transmission line to establish a simulated negative impedance in series with the transmission line, means for controlling the amplitude of the signal at the input means of said current generating means in accordance with signal voltage across the transmission line to establish a simulated negative impedance in shunt with the transmission line, means for varying the difference between the ratio of the voltage which said voltage generating means introduces in series with the transmission line to the signal voltage across the transmission line and the ratio of the current which said current generating means introduces in shunt with the transmission line to the signal current through the transmission line, as a function of frequency, to match the impedances of the apparatus to the impedances of the transmission line over the band of frequencies to be transmitted through the transmission line.

* * * * *

UNITED STATES PATENT OFFICE

CERTIFICATE OF CORRECTION

Patent No. 3,828,281 Dated August 6, 1974

Inventor(s) Charles W. Chambers, Jr.

It is certified that error appears in the above-identified patent and that said Letters Patent are hereby corrected as shown below:

In the specification, Column 1, line 28, change "impedance" to --impedances--, and line 54, change "directions" to --direction--. Column 11, line 2, change "T2-T3" to --T2-T4--, and line 4, change "T4" to --impedance--. Column 12, line 12, change "transformations" to --transformation--. Column 13, lines 12 and 13, change "$12a_{-1}$-$12b_1$" to --$12a_1$-$12b_1$--, and lines 17 and 18, change "$12a_{-2}$-$12b_2$" to --$12a_2$-$12b_2$--.

In the claims, Column 15, lines 66 and 67, delete "said voltage sensing means and said voltage feedback means".

Signed and sealed this 5th day of November 1974.

(SEAL)
Attest:

McCOY M. GIBSON JR.
Attesting Officer

C. MARSHALL DANN
Commissioner of Patents